G. W. DOOLITTLE.
Grain-Drill.
No. 61,326.    Patented Jan. 22, 1867.
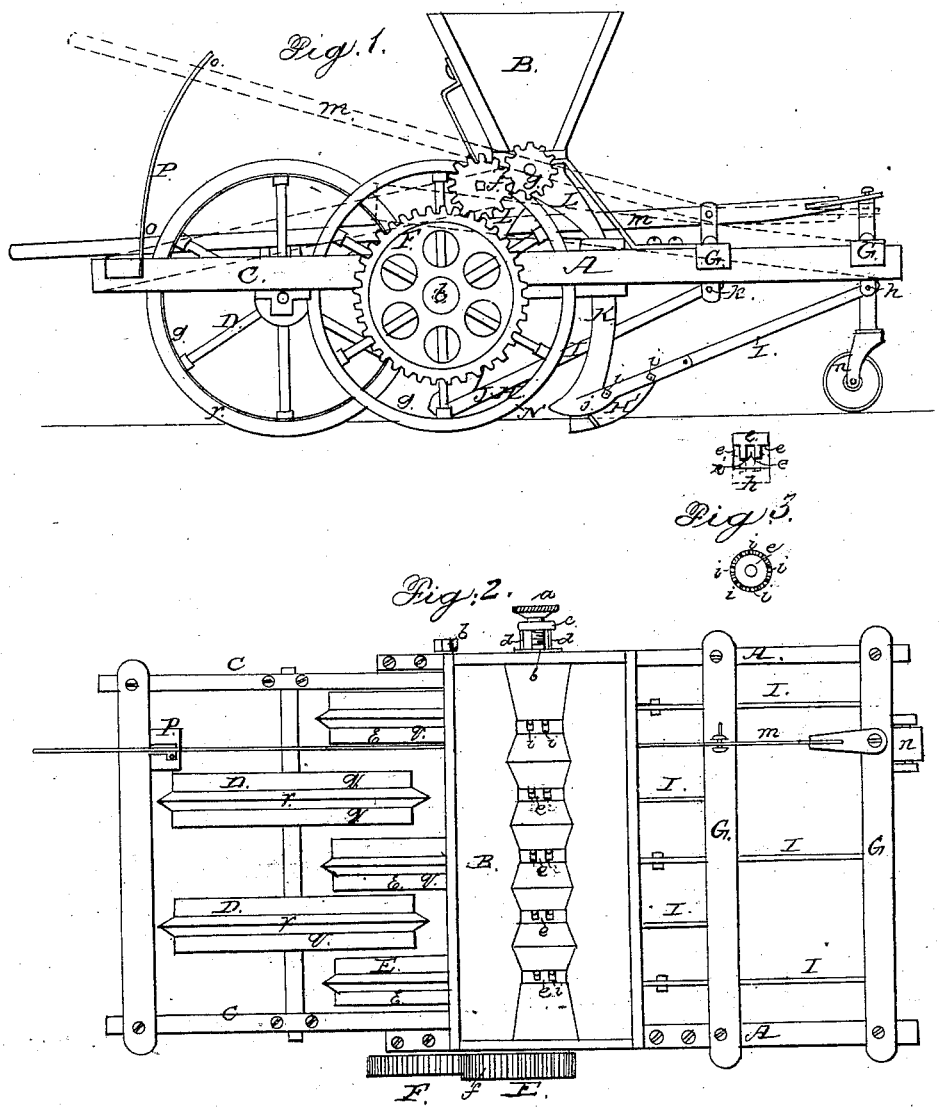
WITNESSES:
INVENTOR:

United States Patent Office.

GEORGE W. DOOLITTLE, OF LINCOLN, ILLINOIS.

Letters Patent No. 61,326, dated January 22, 1867.

IMPROVEMENT IN WHEAT-DRILLS.

The Schedule referred to in these Letters Patent and making part of the same.

TO ALL WHOM IT MAY CONCERN:

Be it known that I, GEORGE W. DOOLITTLE, of Lincoln, in the county of Logan, in the State of Illinois, have invented certain new and useful improvements in Wheat-Drills; and the following is a full, clear, and exact description of the same, reference being had to the accompanying drawings, making a part of this specification, in which—

Figure 1 represents a side view of the machine for drilling in wheat.

Figure 2 shows a plan or top view of the same.

Figure 3 shows a side and end view of one of the adjustable box cylinders for regulating the quantity of seed drilled in.

The object of my invention is to drill in wheat, leaving it compressed in a V-shaped track of sufficient depth to prevent it from being frozen out or thrown out by anchor ice, by the ground freezing and thawing during the winter; also to be able to drill in wheat, in corn stubble, or trashy land, without obstructing the cutting into the soil, and making the furrows of sufficient depth to deposit the seed.

My invention consists in the arrangement of the jointed frame, to which two or more series of V-shaped compressing-wheels are attached, in combination with the drill or depositing tubes, to which cutter-blades are attached and secured between angular bars, so as to be taken out for sharpening. Also, the arrangement of the lever, caster, and standard mechanism for controlling the depth of the drilling, and lifting the tubes out of the earth for turning round at the ends of the field, &c., and at the same time stopping the delivering mechanism.

To enable others to make and use my improved wheat-drill, I will describe it more fully, referring to the drawings, and the letters marked thereon.

I make my main frame A A, and all of the framework which supports the hopper B, of square timber, notched or halved together, and secured with bolts in the ordinary manner; the rear portion of the frame C C being jointed and hinged to the rear ends of the main frame side pieces A A, so as to jack up and lift all but the two rear wheels D D out of and off the ground. The other compressing-wheels, E E E, two of which are secured to the shaft to drive the discharging cylinders $e\ e\ e\ e$, have their bearings in journal-boxes secured to the rear ends of the main frame A A. On the end of the shaft $b$ is a spur gear-wheel, F, an intermediate pinion, $f$, and pinion, $g$; on the shaft of the rotating box cylinders $e\ e\ e$, so that their speed is increased several times greater than the presser-rollers. The cavities $i\ i\ i\ i$ in the periphery of the cylinders $o\ o\ o$ are made so that they may be closed up and not deliver any seed, or they may all be opened to regulate the quantity of seed equally to be deposited in each drill by one operation, that of turning the thumb-nut $a$ on the opposite end of the shaft $b$, the thumb-nut $a$ being connected with the stirrup $c$, to whose rods $d\ d$ the movable portion $p\ p$ of all of the series of feeding cylinders $o\ o\ o$ is attached. The drills or furrows in which the seed wheat is deposited are made with bars of flat iron I I I, having an opening between the rear ends J J of sufficient space to fit in strong cutters H H, made of tempered steel; they being secured by bolts $j\ j$, so as to be easily taken out and ground and made very sharp to cut through corn stalks or stubble of any kind. The iron bars I are made fast to the conducting tubes K in such a position that the seed wheat is discharged close in the rear of the steel cutters H in the narrow opening between the iron bars I I before any of the earth falls in upon it, which does immediately after as the machine advances, when the V-shaped wheels press the earth smoothly upon the seed, leaving a durable trench or groove in which the grain comes up and grows in the fall. When the frosts and snows of winter come they drift in and fill these grooves or trenches, so that the wheat is not reached by temporary thawing on the surface in mild sunny days in winter, which is the main cause of winter killing wheat in the West; the drill tubes K being connected at the lower ends to the iron bars I I on an angle, so that the bars extend forward and are hinged to projecting studs $k\ k$ on the under side of the cross-timbers G G of the frame A A, so that all of the draught for cutting through stubble and opening the earth is on the iron bars; the tubes K being provided with helical springs at the top which will allow each tube to raise up to pass over an obstruction that cannot be cut through by the sharp cutting-blades H, independently of each other, or the machine. The seed wheat being put in the hopper B, which is mounted on the frame A A, over the drill-tubes K, they and the compressing-wheels D D and E E being placed zigzag or in two series, the adjustable box cylinders $e\ e\ e\ e$, operating under the bottom of the hopper B, admit the seed into separate funnels L L, which conduct it into the tubes. When the drilling machine is taken to the field, and when turning round at the ends of the field, the cutting-blades and tubes and the forward section of the compressing-wheels are lifted out of and off the ground by the action of the lever $m$ forcing the caster-roller $n$ down, at the same time stopping the revolving of the delivering mechanism. The lever $m$ is held in either position by the notches $o\ o$ in the guide-standard P, at the rear end of the machine.

My improved wheat-drill, as above described, can be used as a one-horse drill, or two of them, with the gear-wheels placed upon the other side of the duplicate, making them right and left, can be easily coupled together, and two horses attached, and do twice the amount of work in a given time by one operation.

The compressing-wheels D E are constructed with broad flanges $q\ q$, in the centre of which is a V-shaped rim, $r$, to form smooth trenches or lasting grooves in the drills for the wheat to grow in. The wheels D D E may revolve on the shafts independently of each other; all but the two end wheels on the forward shaft, which require to be secured to the shaft in order to drive the discharging mechanism.

Having thus fully described my invention, what I claim as new, and desire to secure by Letters Patent, is—

1. The jointed frame A C, to which the compressing-wheels D E are attached, in combination with the funnels L L, depositing tubes K, angular bars I I, cutter-blades H H, substantially as arranged for the purposes herein set forth.

2. I claim the arrangement of the standard P, lever $m$, caster $n$, for controlling the depth of the drills K, or lifting them out of the earth, in combination with the drills or delivering tubes, and the mechanism for regulating the quantity of seed, substantially as herein described for the purposes specified.

GEORGE W. DOOLITTLE.

Witnesses:
EDM. F. BROWN,
J. B. WOODRUFF.